United States Patent Office 3,084,121
Patented Apr. 2, 1963

1

3,084,121
TREATMENT OF DRILLING FLUID
Ludwig D. Wiener, Dallas, Tex., assignor, by mesne assignments, to Socony Mobil Oil Company, Inc., New York, N.Y., a corporation of New York
No Drawing. Filed Feb. 11, 1959, Ser. No. 792,460
15 Claims. (Cl. 252—8.5)

This invention relates to drilling fluids and relates more particularly to the treatment of a drilling fluid to change its properties.

In the rotary drilling of wells, such as those for petroleum oil or gas, a drilling fluid is continuously circulated from the surface of the ground to the bottom of the well bore hole and back to the surface of the ground again. The drilling fluid has various functions including those of lubricating the drill bit and pipe, carrying cuttings from the bottom of the well bore hole to the surface of the ground, and imposing a hydrostatic pressure on the drilled formations to prevent escape of oil, gas, or water therefrom into the well bore hole during the drilling operations. Ordinarily, a drilling fluid comprises a suspension of clay in a liquid phase containing water.

Drilling fluids containing calcium are often employed. The calcium reacts with the clay to convert the clay from its sodium form to its calcium form. The calcium form of the clay swells and disperses in water to a lesser extent than the sodium form. Thus, the drilling fluid is capable of containing a greater amount of clay solids, with consequent increase in density, without excessive increase in viscosity. Further, any clays picked up during drilling will have a minimum effect on the viscosity of the fluid. Additionally, contamination of the drilling fluid with calcium, from anhydrite or cement, for example, will have little effect on the viscosity of the fluid. Another advantage of a drilling fluid containing calcium is the fact that clay particles in the calcium form are larger than those in the sodium form and therefore do not penetrate formation pores as readily. These drilling fluids, accordingly, have been used where a high density fluid is required and shale or anhydrite formation, or contamination with cement, is apt to be encountered. Particularly, these fluids have found considerable use in drilling operations along the gulf coast of the United States.

The source of a portion, at least, of the calcium added purposely to a drilling fluid is lime. Other calcium salts, such as calcium chloride or calcium sulfate, may be employed. However, drilling fluids containing calcium require a thinner to effect proper viscosity control and some of these thinners require an alkaline environment to be soluble. Thus, lime is often preferred as the source of calcium. The degree of alkalinity imparted by the lime may not be sufficient for solubilization of the thinner and, in these cases, caustic soda is employed to increase further the alkalinity of the fluid.

While the use of drilling fluids containing lime is indicated in various instances, there are other instances where their use is not indicated. Drilling fluids containing lime, because of their alkalinity, suffer from gelation and cementation where temperatures in excess of about 250° F. and 275° F., the precise temperature depending upon the composition of the fluid, are encountered. With excessive gelation and cementation, undesirable pump pressures are required to maintain circulation, movement of logging tools through the well bore hole is restricted or

2 prevented, and maintenance costs for the fluid become excessive. As the well bore hole becomes progressively deeper, the temperatures of the formations encountered increase. Accordingly, while a drilling fluid containing lime may be used during drilling of the well at moderate depths, the drilling fluid may become unsatisfactory for use at greater depths. Further, when completing a well, or because of other circumstances, the drilling fluid previously employed may be unsatisfactory. Under these conditions, it becomes necessary to replace the drilling fluid. However, weighted drilling fluids are expensive and a replacement of such a drilling fluid represents a considerable item in the cost of drilling a well.

It is an object of this invention to treat a drilling fluid. It is another object of this invention to change the properties of a drilling fluid. It is another object of this invention to reduce the necessity for replacing a drilling fluid. It is another object of this invention to decrease the cost of drilling a well. It is another object of this invention to reduce the alkalinity of a drilling fluid. It is another object of this invention to remove lime from a drilling fluid. Other objects of the invention will become apparent from the following description.

In accordance with an embodiment of the invention, a drilling fluid containing lime and water is treated by adding to the fluid a water-soluble compound providing monovalent bicarbonate radical. In a more specific embodiment of the invention, there is also added to the drilling fluid a water-soluble salt of a strong acid, which salt provides a cation capable of reacting with divalent carbonate radical to form therewith a water-insoluble compound.

By addition the drilling fluid of a water-soluble compound providing monovalent bicarbonate radical,

there is provided within the fluid the bicarbonate anion. The lime in the drilling fluid provides divalent calcium cation and the bicarbonate anion and the calcium cation combine to form calcium carbonate. The calcium carbonate is relatively insoluble in water and accordingly will precipitate from the water phase of the drilling fluid. Thus, the lime, as such, and from the standpoint of its effect on alkalinity, is removed from the drilling fluid. Where the drilling fluid still contains free hydroxyl ion, as a result either of previous addition of caustic soda to increase the alkalinity of the fluid or formed within the fluid by reaction between the cation of the compound providing the bicarbonate radical and the hydroxyl ion of the lime, and it is desired to reduce further the alkalinity of the fluid, additional treatment is effected. This additional treatment comprises adding to the drilling fluid an amount of water-soluble compound providing the monovalent bicarbonate radical which amount is in excess of that required to react with all of the lime in the fluid. This additional treatment effects neutralization of the free hydroxyl ion but, on the other hand, forms in the fluid a salt of a strong base and a weak acid which salt, because of hydrolysis, imparts a high degree of alkalinity to the fluid. In this case, there is also added to the drilling fluid the water-soluble salt of a strong acid, which salt provides a cation capable of reacting with the divalent carbonate radical to form therewith a water-insoluble compound. Thus, the salt causing undesirably high alkalinity is converted to a water-insoluble carbonate and a salt which, being formed of the cation of a strong base and an anion of a strong acid, is neutral in aqueous solution.

By the process of the invention the drilling fluid is freed of lime as such. The drilling fluid is also reduced in alkalinity. The fluid, after treatment, will contain calcium carbonate. It may also contain a neutral salt. Neither the calcium carbonate nor the neutral salt has any significant effect on the flow properties of the drilling fluid. Thus, the fluid is resistant to high temperature gelation and cementation and is effective for the further drilling or for the completion of a well.

In drilling fluids containing lime, the amount of lime will vary from fluid to fluid. For example, the so-called "lime-treated muds" will contain between about two or three pounds of lime per barrel of fluid. In these fluids, there will be little or no insoluble lime. In the so-called "lime muds," "limed muds," or "red lime muds," there will be between six and twelve pounds of lime per barrel of fluid. Additionally, a drilling fluid can pick up lime when cement is being drilled. Thus, drilling fluids may contain lime varying in amounts from insignificant to two to twelve or more pounds per barrel. Various of these drilling fluids will also contain calcium salts in addition to the lime. These salts may include calcium sulfate or calcium chloride and will be added, for example, to provide a filtrate containing calcium ions which filtrate will have a minimum swelling effect on shales or other clay-containing formations.

Water-soluble compounds providing the monovalent bicarbonate radical which may be employed include the bicarbonates which have monovalent positive radicals as the cation. These monovalent radicals include those of hydrogen, ammonia, and the monovalent metals. Included among the monovalent metals are caesium, lithium, potassium, rubidium, and sodium. Accordingly, there may be employed, as a water-soluble compound providing the monovalent bicarbonate radical, ammonium bicarbonate, caesium bicarbonate, lithium bicarbonate, potassium bicarbonate, rubidium bicarbonate, and sodium bicarbonate. As the water-soluble compound providing the monovalent bicarbonate radical, it is preferred to employ sodium bicarbonate.

The bicarbonate of hydrogen is carbonic acid. Carbonic acid is the reaction product of water and carbon dioxide and initially ionizes to form the hydrogen cation and the bicarbonate anion. Thus, a water-soluble compound providing the monovalent bicarbonate radical which may be employed is carbon dioxide. This compound may be characterized as providing a bicarbonate radical and having a cation whose hydroxide in water has an ionization constant not greater than $1 \times 10^{-14}$.

The bicarbonates of ammonia, caesium, lithium, potassium, rubidium, and sodium may be characterized as providing a bicarbonate radical and having a cation whose hydroxide in water has an ionization constant greater than $1 \times 10^{-14}$. The hydroxide of ammonia is a weak base and in water has an ionization constant of $1.8 \times 10^{-5}$ at 25° C. Salts of ammonia, therefore, on hydrolysis, are slightly alkaline or neutral where the anion of the salt is that of a weak acid. The hydroxides of caesium, lithium, potassium, rubidium, and sodium are strong bases and in water have ionization constants greater than $10^{-2}$. Thus, the salts of these metals, on hydrolysis, will be strongly alkaline if the anion of the salt is that of weak acid. The bicarbonate of ammonia, therefore, may be characterized as being the bicarbonate of a cation whose salt of a weak acid is only slightly alkaline or neutral on hydrolysis. The bicarbonates of caesium, lithium, potassium, rubidium, or sodium may be characterized as being the bicarbonates of cation whose salt of a weak acid is strongly alkaline on hydrolysis.

Carbon dioxide may be employed in the gas phase or in the solid phase. Carbon dioxide either in the gas state or the solid state may be added directly to the drilling fluid at the mud pit or elsewhere as desired. A convenient source of carbon dioxide is the gaseous effluent from wells containing appreciable quantities of carbon dioxide.

The amount of water-soluble compound providing monovalent bicarbonate radical to be added to the drilling fluid will depend upon the extent to which the alkalinity of the drilling fluid and the amount of lime is to be reduced. For removal of all of the lime in the drilling fluid, by conversion to calcium carbonate, an equivalent amount of water-soluble compound will be employed. Thus, for each mol of lime in the drilling fluid, a mol of water-soluble compound will be added.

While the addition to the drilling fluid of an amount of water-soluble compound providing monovalent bicarbonate radical equivalent to the amount of lime will convert all the lime to calcium carbonate, the alkalinity of the drilling fluid may or may not be reduced depending upon the presence of hydroxyl ion in the drilling fluid. Sodium hydroxide or other caustic may be present in the drilling fluid as a component purposely added, for example, to solubilize a thinner. Additionally, hydroxyl ion may be present in the drilling fluid as the reaction product of lime with the water-soluble compound providing the monovalent bicarbonate radical. Where carbon dioxide is employed as the water-soluble compound providing the monovalent bicarbonate radical, the lime is converted to calcium carbonate without production of a second reaction product other than water. On the other hand, where a bicarbonate of ammonia, caesium, lithium, potassium, rubidium, or sodium is employed, a second reaction product is formed. This product is the hydroxide, respectively, of ammonia, caesium, lithium, potassium, rubidium, or sodium. Thus, where a bicarbonate of ammonia, caesium, lithium, potassium, rubidium, or sodium is employed, the drilling fluid will contain, in addition to any hydroxyl ion purposely added, an amount of hydroxyl ion equivalent to the amount of these bicarbonates added to the fluid.

For reduction of the alkalinity of the drilling fluid due to the presence of hydroxyl ion, an additional amount of water-soluble compound providing the monovalent bicarbonate radical is added to the drilling fluid. The bicarbonate anion reacts with the hydroxyl ion to form a carbonate which has, as its cation, the cation of the water-soluble compound. The additional amount of the water-soluble compound employed will depend upon the extent to which the alkalinity is to be reduced. Where the hydroxyl ion contained in the drilling fluid is due entirely to the production of a second reaction product between the lime and the water-soluble compound providing the monovalent bicarbonate radical, an additional amount of this water-soluble compound equal to the original amount is added to the fluid. Thus, where the water-soluble compound providing the monovalent bicarbonate radical is a bicarbonate of ammonium, caesium, lithium, potassium, rubidium, or sodium, the addition to the drilling fluid of an amount of these compounds equivalent to twice the amount of lime in the fluid will convert the lime to calcium carbonate and react completely with the hydroxyl ion produced as a second reaction product. Thus, for each mol of lime originally present in the drilling fluid, at least two mols of these water-soluble compounds will be added. Where the drilling fluid contains hydroxyl ion as a result of sodium hydroxide, or other caustic compound, being added purposely to the drilling fluid, an additional amount of these water-soluble compounds providing the monovalent bicarbonate radical is added. An amount equivalent to this additional hydroxyl ion will react with all the hydroxyl ion.

The addition to the drilling fluid of a bicarbonate of ammonium, caesium, lithium, potassium, rubidium, or sodium, in an amount greater than the amount equivalent to the lime in the drilling fluid, will, as indicated, provide in the fluid the carbonate of the compound. The carbonate of ammonium is a neutral or only slightly alkaline salt. Thus, where ammonium bicarbonate is employed, neutralization of the hydroxyl ion produces an essentially neutral salt, and this salt makes no significant change in the alkalinity of the drilling fluid. On the other hand, the carbonates of caesium, lithium, potassium, rubidium, and sodium, being salts of a strong base and a weak acid, hydrolyze in water to produce an alkaline solution. Thus, with neutralization of all the hydroxyl ion employing these latter bicarbonates, the drilling fluid may still be undesirably alkaline. For reduction of this alkalinity, there is added to the drilling fluid the water-soluble salt of a strong acid, which salt provides a cation capable of reacting with the divalent carbonate radical to form therewith a water-insoluble compound.

The water-soluble salt of a strong acid, which salt provides a cation capable of reacting with divalent carbonate radical to form therewith a water-insoluble compound, reacts with the alkaline carbonate in the drilling fluid to remove from solution, in the form of a precipitate, the carbonate radical. The cation of the water-soluble salt of the strong acid reacts with the anion to form a neutral salt. Thus, the net effect of the addition of the water-soluble salt of a strong acid is a reduction in the alkalinity of the drilling fluid.

The extent to which the alkalinity arising from the presence of the divalent carbonate radical is to be reduced will determine the amount of water-soluble salt of a strong acid which is to employed. For reaction with the entire amount of divalent carbonate radical, an equivalent amount of water-soluble salt of a strong acid will be employed. Thus, in this case, one mol of water-soluble salt of a strong acid will be employed for each mol of lime originally present in the drilling fluid.

The water-soluble salts of a strong acid which may be employed include those of the alkaline earth metals. These include the salts of calcium, barium, magnesium, and strontium. These strong acids from which the salts are derived, where the salt is water-soluble, include the halogen acids, sulfuric acid, nitric acid, and phosphoric acid. Preferably, the water-soluble salt of a strong acid is a calcium salt. Further, preferably, the salt is a salt of either hydrochloric acid or sulfuric acid. Accordingly, calcium chloride or calcium sulfate is preferred. It is particularly preferred to employ calcium sulfate.

Ammonium, caesium, lithium, potassium, rubidium, and sodium bicarbonates are solids. The water-soluble salts of a strong acid are also solids. These compounds may be added in the solid state to the drilling fluid at the mud pit or elsewhere. Agitation may be employed to effect solution of the solid compounds in the mud pit and this agitation may be obtained with the mud guns. Agitation can also be provided by virtue of circulation of the fluid through the drilling fluid system. The compounds may also be added to the drilling fluid in the form of an aqueous solution.

In adding to the drilling fluid the water-soluble compound providing the monovalent bicarbonate radical and the water-soluble salts of a strong acid, the compounds are desirably added progressively as circulation of the fluid is continued. In this way, relatively rapid distribution of the compounds through the entire amount of drilling fluid is obtained. Of course, the total amount of compounds employed can be added at one time, if desired, and distribution will be effected as circulation of the fluid is continued. Where the water-soluble salt of a strong acid is employed, it may be added to the drilling fluid at the same time as the water-soluble compound providing the monovalent bicarbonate radical.

In the treatment of a drilling fluid by the process of the invention, it may occasionally be that the solids content is undesirably high. Prior to treatment, therefore, the concentration of the solids may be lowered. This may be carried out by dilution with water or, where the fluid is a weighted fluid, centrifuging the fluid whereby a desired portion of the solids are removed. Further, a thinner may be added to the drilling fluid prior to or during treatment. Such thinners include lignosulfonates, carboxymethylcellulose, and surfactants. A surfactant which may be employed is an oxyethylene derivative of an alkyl phenol, for example, oxyethylene ether of phenol containing about 30 mols of ethylene oxide.

A particular advantage of the invention resides in the fact that the drilling fluid cannot be overtreated, from the standpoint of irreversibly and deleteriously affecting the fluid with either the water-soluble compound providing the monovalent bicarbonate radical, the water-soluble salt of a strong acid, or both of these types of compounds. By overtreating, I mean employing an amount of either of these types of compounds in excess of the stoichiometric amount. Accordingly, in the practice of the invention, it is not necessary to know precisely the amount of lime, or sodium hydroxide or other caustic, in the drilling fluid in order to obtain a desired reduction in the alkalinity of the fluid. Where the amount of the lime and sodium hydroxide or other caustic is not known, the water-soluble compound providing monovalent bicarbonate radical, and the water-soluble salt of the acid where used, or both, can be added to the fluid in increasing amounts until the desired degree of alkalinity is effected. Preferably, in such cases, where the water-soluble salt of a strong acid is employed, this salt is added together, such as in mixture with each other, with the water-soluble compound providing monovalent bicarbonate radical. Preferably, further, these compounds will be added to the fluid, and in mixture with each other, in the relative proportions of two mols of the water-soluble compound providing bicarbonate radical and one mol of the water-soluble salt of a strong acid.

The following examples will be illustrative of the invention.

*Example I*

A well was being drilled in the gulf coast of the United States employing a drilling fluid containing lime. The amount of lime in this drilling fluid was about four pounds per barrel. Calcium chloride had also been added to the drilling fluid to bring the calcium ion concentration in the filtrate to 400–500 parts per million and thereby decrease swelling of shale encountered during drilling. Lignosulfonate thinner in the amount of three pounds per barrel was also contained in the fluid. The pH of the fluid was 11.5 and its density was 17.7 pounds per gallon.

When the well had been drilled to 15,910 feet, the bottom hole temperature was about 300° F. and gelation of the drilling fluid had occurred. Gelation was sufficiently great to make it impossible to pass a logging tool through the fluid to the bottom of the well. At this depth, there was added to the drilling fluid sodium bicarbonate in the amount of two equivalents of the amount of lime and calcium sulfate in the amount of one equivalent of the amount of lime. The sodium bicarbonate and calcium sulfate were added together and were added during one complete circulation of the drilling fluid. This treatment removed the lime and the final pH of the drilling fluid was 8.5. While the pH was being lowered, the drilling fluid continued to be easily pumpable. At the final pH attained the fluid was no longer subject to high temperature gelation and logging tools were able to be passed through the fluid to the bottom of the well.

*Example II*

This example will be illustrative of the treatment of an unweighted, high pH, high calcium drilling fluid.

A drilling fluid was prepared by mixing water and a clay mixture. The clay mixture contained, by weight, 60 percent of calcium montmorillonite, 17 percent of sodium montmorillonite, and 23 percent of illite. The water and the clay mixture were in the proportion of 20 pounds of clay mixture to one barrel of water. To the resulting slurry were added eight pounds per barrel of water of a commercial composition employed for preparing lime-containing drilling fluids. This composition contained calcium chloride, calcium lignosulfonate, and about 32 percent by weight of hydrated lime. The calcium chloride in the commercial composition is for the purpose of providing a drilling fluid filtrate having a relatively high calcium ion concentration. The eight pounds per barrel of water of the commercial composition were equivalent to 0.035 pound mol of lime per barrel of water. Thereafter, there were added to the slurry an additional 30 pounds of the clay mixture per barrel of water and five pounds of starch per barrel of water. The drilling fluid was then aged overnight at 170° F. and its properties were measured.

A mixture of sodium bicarbonate and calcium sulfate was added to the drilling fluid. The calcium sulfate in the mixture was anhydrous. This mixture contained the sodium bicarbonate and the calcium sulfate in the molar ratio of 2:1, or a weight ratio of 1:0.8. The amount of this mixture added to the drilling fluid was 10.8 pounds per barrel of water, an equivalent of six pounds, or 0.071 mol, of sodium bicarbonate per barrel of water and 4.8 pounds, or 0.035 mol, of calcium sulfate per barrel of water. The properties of the drilling fluid were again measured.

The table gives the results obtained. In the table, as well as the tables following, "Initial" and "Final" refer to the properties of the drilling prior and subsequent, respectively, to the addition of the sodium bicarbonate and calcium sulfate.

|  | pH | Plastic viscosity (cp.) | Yield point (lb./100 ft.$^2$) | Gel strengths (lb./100 ft.$^2$) | | API 30-min. water loss (cc.) |
|---|---|---|---|---|---|---|
|  |  |  |  | Initial | 10-min. |  |
| Initial | 11.9 | 18 | 2 | 1 | 4 | 14.7 |
| Final | 7.65 | 8 | 6½ | 2 | 5+ | 13.8 |

*Example III*

This example will also illustrate the treatment of an unweighted, high pH, high calcium drilling fluid.

A drilling fluid was prepared similarly as described above in Example II. However, the clay mixture was employed in the total amount of 70 pounds per barrel of water and the commercial composition containing lime was employed in the amount of 11 pounds per barrel of water. This amount of lime was equivalent to 0.048 pound mol of lime per barrel of water. Properties of the drilling fluid after aging overnight at 170° F. were measured.

To the drilling fluid was added a mixture of sodium bicarbonate and calcium sulfate. The mixture was the same as described in the previous example. The mixture was employed in the amount of 13.5 pounds per barrel of water, equivalent to an amount of 7.5 pounds. 0.087 mol, of sodium bicarbonate and 6 pounds, 0.044 mol, of calcium sulfate. Thereafter, there was added to the fluid an additional three-quarters of a pound, 0.0087 mol, of sodium bicarbonate. The commercial composition containing lime supplied calcium chloride to react with sodium carbonate produced by reaction of the sodium bicarbonate with lime in the fluid. After this treatment, the properties of the drilling fluid were again determined.

The table gives the properties of the drilling fluid.

|  | pH | Plastic viscosity (cp.) | Yield point (lb./100 ft.$^2$) | Gel strengths (lb./100 ft.$^2$) | | API 30-min. water loss (cc.) |
|---|---|---|---|---|---|---|
|  |  |  |  | Initial | 10-min. |  |
| Initial | 11.9 | 22 | 4½ | 1+ | 17 | 16.4 |
| Final | 9.0 | 13 | 5 | 2+ | 16 | 8.2 |

*Example IV*

This example will illustrate the treatment of a heavily weighted drilling fluid containing lime.

A drilling fluid was taken from the mud pit at a well which was being drilled along the gulf coast of the United States. This drilling fluid contained lime in the amount of about 2.2 pounds, or 0.030 mol, of lime per barrel. It also had a density of 17.6 pounds per gallon. The solids content of the drilling fluid was first reduced by addition of water. The density of the fluid was then adjusted to 17.4 pounds per gallon by addition of barite obtained by dilution with water of a portion of the original fluid followed by centrifuging. The properties of this drilling fluid were then measured.

To the drilling fluid was added, in increments, a total of nine pounds per barrel of the mixture of sodium bicarbonate and calcium sulfate mentioned in the previous examples. This amount was equivalent to five pounds, 0.060 mol, of sodium bicarbonate and four pounds, 0.029 mol, of calcium sulfate. With the last increment of mixture, which was in the amount of 1.8 pounds per barrel of the fluid, was also added, in the amount of one and one-tenth pounds per barrel of the fluid, oxyethylene ether of phenol containing 30 mols of ethylene oxide per mol of phenol. The properties of the fluid were again measured.

The table gives the properties.

|  | pH | Plastic viscosity (cp.) | Yield point (lb./100 ft.$^2$) | Gel strengths (lb./100 ft.$^2$) | | API 30-min. water loss (cc.) |
|---|---|---|---|---|---|---|
|  |  |  |  | Initial | 10-min. |  |
| Initial | 12.2 | 44½ | 5½ | 1 | 1 | 2.2 |
| Final | 9.2 | 47 | 9½ | 1 | 20 | 2.2 |

It will be noted that, in these examples, the gel strength of the drilling fluid can increase after addition of the sodium bicarbonate and the calcium sulfate. However, lime-containing drilling fluids are characterized by a low initial gel strength and a small increase of gel strength with time. These drilling fluids are further characterized by a substantially uniform rate of increase in gel strength for a comparatively long period of time. Thus, lime-containing drilling fluids can develop, eventually, a comparatively high gel strength. On the other hand, corresponding drilling fluid free of lime is characterized by low initial gel strength, rapid build-up of gel strength initially, and attainment of maximum gel strength within a comparatively short period of time. Thus, a drilling fluid free of lime, while attaining its maximum gel strength sooner than a lime-containing drilling fluid, will have a lower maximum gel strength than a lime containing drilling fluid.

*Example V*

This example will be illustrative of the treatment of an unweighted, lime-base drilling fluid.

A drilling fluid was prepared by admixing water, the clay mixture described in Examples II and III, caustic soda, and quebracho in the following proportions: water—one barrel; clay mixture—20 pounds; caustic soda—3 pounds; and quebracho—3 pounds. The resulting slurry was aged overnight at 170° F. and there was then added to it lime in the amount of five pounds, 0.068 mol, per barrel of water and salt in the amount to give a concentration in the water of 10,000 parts per million. After again aging overnight at 170° F., 30 more pounds of the clay mixture and four pounds of starch per barrel of water were added. The slurry was aged overnight at 170° F. for the third time. The properties of the resulting drilling fluid were then measured.

To the drilling fluid were added polyoxyethylene ether of phenol in the amount of four and one-half pounds per barrel of water and ferro-chrome lignosulfonate in the amount of ten pounds per barrel of water. There was then added to the drilling fluid the mixture, mentioned in the previous examples, of sodium bicarbonate and calcium sulfate in the amount of 27 pounds per barrel of water. This amount was equivalent to 15 pounds, 0.179 mol, of sodium bicarbonate per barrel of water and 12 pounds, 0.088 mol, of calcium sulfate per barrel of water. The properties of the fluid were then measured. The table gives the properties of the fluid.

|  | pH | Plastic viscosity (cp.) | Yield point (lb./100 ft.²) | Gel strengths (lb./100 ft.²) | | API 30-min. water loss (cc.) |
| --- | --- | --- | --- | --- | --- | --- |
|  |  |  |  | Initial | 10-min. |  |
| Initial | 12.7 | 10½ | 2 | 1 | 2 | 5.6 |
| Final | 8.9 | 15½ | 9 | 1+ | 22 | 5.6 |

*Example VI*

This example will be illustrative of the treatment of a heavily weighted, lime-base drilling fluid.

A drilling fluid was prepared by admixing water, the clay mixture previously described, caustic soda, lime, quebracho, calcium chloride, barite, the polyoxyethylene ether of phenol previously described, and ferro-chrome lignosulfonate in the following proportions: water—one barrel; clay mixture—41.5 pounds; caustic soda—3 pounds; lime—5 pounds (0.068 mol); calcium chloride—½ pound; barite to weight the fluid to 17 pounds per gallon; polyoxyethylene ether of phenol—5.0 pounds; and ferro-chrome lignosulfonate—7.6 pounds. The properties of the drilling fluid were then measured. Thereafter, the fluid was treated by the addition thereto, in the amount of 20.5 pounds per barrel of water, of the mixture of sodium bicarbonate and calcium sulfate previously described. This amount was equivalent to 11.4 pounds, 0.136 mol, of sodium bicarbonate and 9.1 pounds, 0.067 mol, of calcium sulfate. The properties of the drilling fluid were then measured. The table gives the results of measurements of the drilling fluid.

|  | pH | Plastic viscosity (cp.) | Yield point (lb./100 ft.²) | Gel strengths (lb./100 ft.²) | | API 30-min. water loss (cc.) |
| --- | --- | --- | --- | --- | --- | --- |
|  |  |  |  | Initial | 10-min. |  |
| Initial | 12.4 | 39 | 3 | 1 | 1 | 4.6 |
| Final | 9.05 | 29½ | 3 | 1 | 18 | 4.6 |

*Example VII*

This example will also illustrate the treatment of an unweighted, lime-base drilling fluid.

A drilling fluid was taken from the mud pit at a well being drilled in the gulf coast of the United States. The drilling fluid contained 8.9 pounds, 0.12 mol, of lime per barrel and had the following properties:

pH _____ 12.7.
Plastic viscosity _____ 32 centipoises.
Yield point _____ 6.5 pounds per 100 ft.².
Initial gel strength _____ 1 pound per 100 ft.².
10-min. gel strength _____ 7 pounds per 100 ft.².
API 30-min. water loss _____ 4.0 cubic centimeters.
Density _____ 11 pounds per gallon.
Total content of solids _____ 230 pounds per barrel of water.

Water was added to reduce the solids content to 188 pounds per barrel. There were then added to the fluid 11.2 pounds per barrel of polyoxyethylene ether of phenol and 10 pounds per barrel of ferro-chrome lignosulfonate. Thereafter, there was added to the fluid in the amount of 27 pounds per barrel of fluid the mixture of sodium bicarbonate and calcium sulfate described in the previous examples. This was equivalent to 15 pounds, 0.179 mol, of sodium bicarbonate per barrel of fluid and 12 pounds, 0.088 mol, of calcium sulfate per barrel of fluid. The properties of the fluid were again measured. The results of these measurements are as follows:

pH _____ 8.8.
Plastic viscosity _____ 19 centipoises.
Yield point _____ 3.5 pounds per 100 ft.².
Initial gel strength _____ 1 pound per 100 ft.².
10-min. gel strength _____ 7 pounds per 100 ft.².
API 30-min. water loss _____ 1.3 cubic centimeters.

*Example VIII*

This example will further illustrate the treatment of a weighted, lime-base mud.

A drilling fluid was prepared containing the following materials:

Bentonite _____ 10 lb./bbl.
Clay mixture _____ 40 lb./bbl.
Caustic soda _____ 3 lb./bbl.
Quebracho _____ 3 lb./bbl.
Lime _____ 5 lb./bbl. (0.068 mol).
Salt _____ 10,000 p.p.m.
Carboxymethyl cellulose ___ 1½ lb./bbl.
Barite _____ 750 lb./bbl. (to 16.8 lb./bbl.).
Diesel oil _____ 6 volume percent (based on final volume).

The amounts of materials indicated are on the basis of one barrel of water. In the preparation of this fluid, the bentonite, caustic soda, and quebracho were added to one barrel of water in a two-barrel kettle equipped with a mud gun for agitation. A gallon of diesel oil was added and the mixture was circulated for two hours. Thereafter, the lime and salt were added. The resulting slurry was circulated for an hour and one and one-fourth pounds of the carboxymethylcellulose and the remainder, namely, three gallons, of the diesel oil were added. Circulation was continued for one-half hour. Thereafter, sufficient of the slurry was discarded to result in an amount of slurry containing three-fourths of a barrel of water. Five pounds of polyoxyethylene ether of phenol and one-fourth of a pound of carboxymethylcellulose were added and the properties of the drilling fluid were measured. These properties were as follows:

pH _____ 12.8.
Plastic viscosity _____ 36.5 centipoises.
Yield point _____ 4 pounds per 100 ft.².
Initial gel strength _____ 1 pound per 100 ft.².
10-min. gel strength _____ 2 pounds per 100 ft.².
API 30-min. water loss _____ 5 cubic centimeters.

A mixture of sodium bicarbonate and calcium sulfate, as described in connection with the previous examples, was added in increments to this drilling fluid. At least one hour was allowed to elapse between each addition of the mixture. Thereafter, four pounds of calcium sulfate were added to the fluid. The properties of the drilling fluid were measured when equilibrium had been established following each addition of the mixture and the calcium sulfate. With the addition of the last increment of the mixture, one-half pound of sodium carboxymethylcellulose was added to the fluid. The table following indicates the cumulative amounts of sodium bicarbonate and calcium sulfate added and the properties of the drilling fluid.

| Cumulative NaHCO₃ added | | Cumulative CaSO₄ added | | Cumulative carboxymethyl cellulose, added (lb./bbl.) |
|---|---|---|---|---|
| (Lb./bbl.) | (Lb./mol.) | (Lb./bbl.) | (Lb./mol.) | |
| 5 | .059 | 4 | .029 | 0 |
| 8 | .095 | 6.4 | .047 | 0 |
| 11 | .131 | 8.8 | .065 | 0 |
| 13 | .156 | 12.4 | .091 | ½ |
| 13 | .156 | 16.4 | .121 | ½ |

| pH | Plastic viscosity (cp.) | Yield point (lb./100 ft.²) | Gel strengths (lb./100 ft.²) | | API 30-min. water loss (cc.) |
|---|---|---|---|---|---|
| | | | Initial | 10-min. | |
| 12.65 | 36½ | 4 | 1 | 4 | 5.4 |
| 12.25 | 36 | 6½ | 1 | 9 | -------- |
| 9.8 | 54 | 18½ | 2+ | 15 | 9.0 |
| 8.45 | 57 | 15½ | 2 | 13 | 5.0 |
| 8.5 | 56 | 15½ | 2 | 12 | 5.3 |

Prior to the addition to the fluid of the sodium bicarbonate and calcium sulfate, a sample was taken and the sample was aged for 40 hours at a temperature of 330° F. Following the aging, the sample was cooled to room temperature and stirred for a period of ten minutes. The plastic viscosity, yield point, gel strength, and pH of the fluid were then measured. A sample of the fluid was taken following the addition of the four pounds of calcium sulfate and this sample was similarly aged, cooled, and stirred and thereafter the same properties were measured. The table gives the results obtained.

| | pH | Plastic viscosity (cp.) | Yield point (lb./100 ft.²) | Gel strengths (lb./100 ft.²) | | API 30-min. water loss (cc.) |
|---|---|---|---|---|---|---|
| | | | | Initial | 10-min. | |
| Initial | 10.6 | 21 | 72 | 47 | 110 | 30 |
| Final | 8.05 | 24 | 14 | 7 | 13 | 27.6 |

Having thus described my invention, it will be understood that such description has been given by way of illustration and example and not by way of limitation, reference for the latter purpose being had to the appended claims.

I claim:

1. In the drilling of a well wherein there is circulated in said well a drilling fluid containing water and lime, the steps comprising adding sodium bicarbonate to said drilling fluid in an amount equivalent to at least twice the amount of said lime in said drilling fluid and adding a calcium salt of a strong acid to said drilling fluid in an amount equivalent to at least said amount of said lime in said drilling fluid, whereby said lime reacts with said sodium bicarbonate to precipitate the calcium ion of said lime in the form of calcium carbonate and said calcium salt of a strong acid reacts with the concomitantly formed alkaline sodium carbonate to precipitate the carbonate ion of said sodium carbonate in the form of calcium carbonate and form the neutral sodium salt of said strong acid, and thereby the alkalinity of said drilling fluid is reduced, and circulating said drilling fluid in said well.

2. The process of claim 1 wherein said calcium salt of a strong acid is calcium chloride.

3. The process of claim 1 wherein said calcium salt of a strong acid is calcium sulfate.

4. The process of claim 1 wherein a thinner is added to said drilling fluid in addition to said sodium bicarbonate and said calcium salt of a strong acid.

5. The process of claim 1 wherein said thinner is oxyethylene ether of phenol containing about 30 mols of ethylene oxide.

6. In the drilling of a well wherein there is circulated in said well a drilling fluid containing water and lime, the steps comprising adding sodium bicarbonate to said drilling fluid in an amount equivalent to at least twice the amount of said lime in said drilling fluid whereby said lime reacts with said sodium bicarbonate to precipitate the calcium ion of said lime in the form of calcium carbonate and thereafter adding a calcium salt of a strong acid to said drilling fluid in an amount equivalent to at least said amount of said lime in said drilling fluid, whereby said calcium salt of a strong acid reacts with the alkaline sodium carbonate concomitantly formed with the calcium carbonate to precipitate the carbonate ion of said dissolved carbonate in the form of calcium carbonate and form the neutral sodium salt of said strong acid, and thereby the alkalinity of said drilling fluid is reduced, and circulating said drilling fluid in said well.

7. The process of claim 6 wherein said calcium salt is calcium chloride.

8. The process of claim 6 wherein said calcium salt is calcium sulfate.

9. The process of claim 6 wherein a thinner is added to said drilling fluid in addition to said sodium bicarbonate and said calcium salt of a strong acid.

10. The process of claim 9 wherein said thinner is oxyethylene ether of phenol containing about 30 mols of ethylene oxide.

11. In the drilling of a well wherein there is circulated in said well a drilling fluid containing water and lime, the steps comprising adding to said drilling fluid a mixture containing sodium bicarbonate and a calcium salt of a strong acid, said mixture containing said sodium bicarbonate in the proportion of two mols to one mol of said calcium salt of a strong acid and being added in an amount to provide in said drilling fluid an amount of sodium bicarbonate equivalent to at least twice the amount of said lime, whereby said lime reacts with said sodium bicarbonate to precipitate the calcium ion of said lime in the form of calcium carbonate and said calcium salt of a strong acid reacts with the concomitantly formed alkaline sodium carbonate to precipitate the carbonate ion of said sodium carbonate in the form of calcium carbonate and form the neutral sodium salt of said strong acid, and thereby the alkalinity of said drilling fluid is reduced, and circulating said drilling fluid in said well.

12. The process of claim 11 wherein said calcium salt is calcium chloride.

13. The process of claim 11 wherein said calcium salt is calcium sulfate.

14. The process of claim 11 wherein a thinner is added to said drilling fluid in addition to said mixture containing sodium bicarbonate and a calcium salt of a strong acid.

15. The process of claim 14 wherein said thinner is oxyethylene ether of phenol containing about 30 mols of ethylene oxide.

References Cited in the file of this patent

UNITED STATES PATENTS

| 2,343,113 | Jones | Feb. 29, 1944 |
| 2,393,166 | Hoeppel | Jan. 15, 1946 |
| 2,433,668 | Jones | Dec. 30, 1947 |
| 2,868,726 | Brukner et al. | Jan. 13, 1959 |
| 2,939,839 | Brukner | June 7, 1960 |
| 2,975,127 | Weiss et al. | Mar. 14, 1961 |

OTHER REFERENCES

Burdyn et al.: That New Drilling Fluid for Hot Holes, article in the Oil and Gas Journal, Sept. 10, 1956, pages 104 to 107.